United States Patent [19]
Miller

[11] 3,962,611
[45] June 8, 1976

[54] AUTOMATIC POWER RESTART FOR UNATTENDED ELECTRICAL EQUIPMENT

[75] Inventor: Bruce Jeffrey Miller, Malvern, Pa.

[73] Assignee: Burroughs Corporation, Detroit, Mich.

[22] Filed: May 19, 1975

[21] Appl. No.: 578,827

[52] U.S. Cl. .............................. 317/154; 317/157
[51] Int. Cl.² ........................................ H03H 7/30
[58] Field of Search ............... 317/154, 157, 135 R, 317/137, 141 R

[56] References Cited
UNITED STATES PATENTS

| | | |
|---|---|---|
| 3,174,133 | 3/1965 | Kunzman, Jr. et al. .......... 317/137 X |
| 3,254,272 | 5/1966 | McIntosh ........................... 317/157 |
| 3,764,852 | 10/1973 | Olson ........................... 317/141 R X |

Primary Examiner—R. N. Envall, Jr.
Attorney, Agent, or Firm—Francis A. Varallo; Edward J. Feeney, Jr.; Kevin R. Peterson

[57] ABSTRACT

The present disclosure describes electrical circuit means for providing an automatic power restart for unattended electrical equipment, such as computer cabinets, after an AC power failure and subsequent power restoration. The restart function is performed without interfering with the normal cabinet power sequencing during attended operation or maintenance. The circuit which utilizes a latch-in type relay to "remember" the last manually selected power control setting has general utility in new installations, as well as being adaptable to existing cabinet power systems.

6 Claims, 1 Drawing Figure

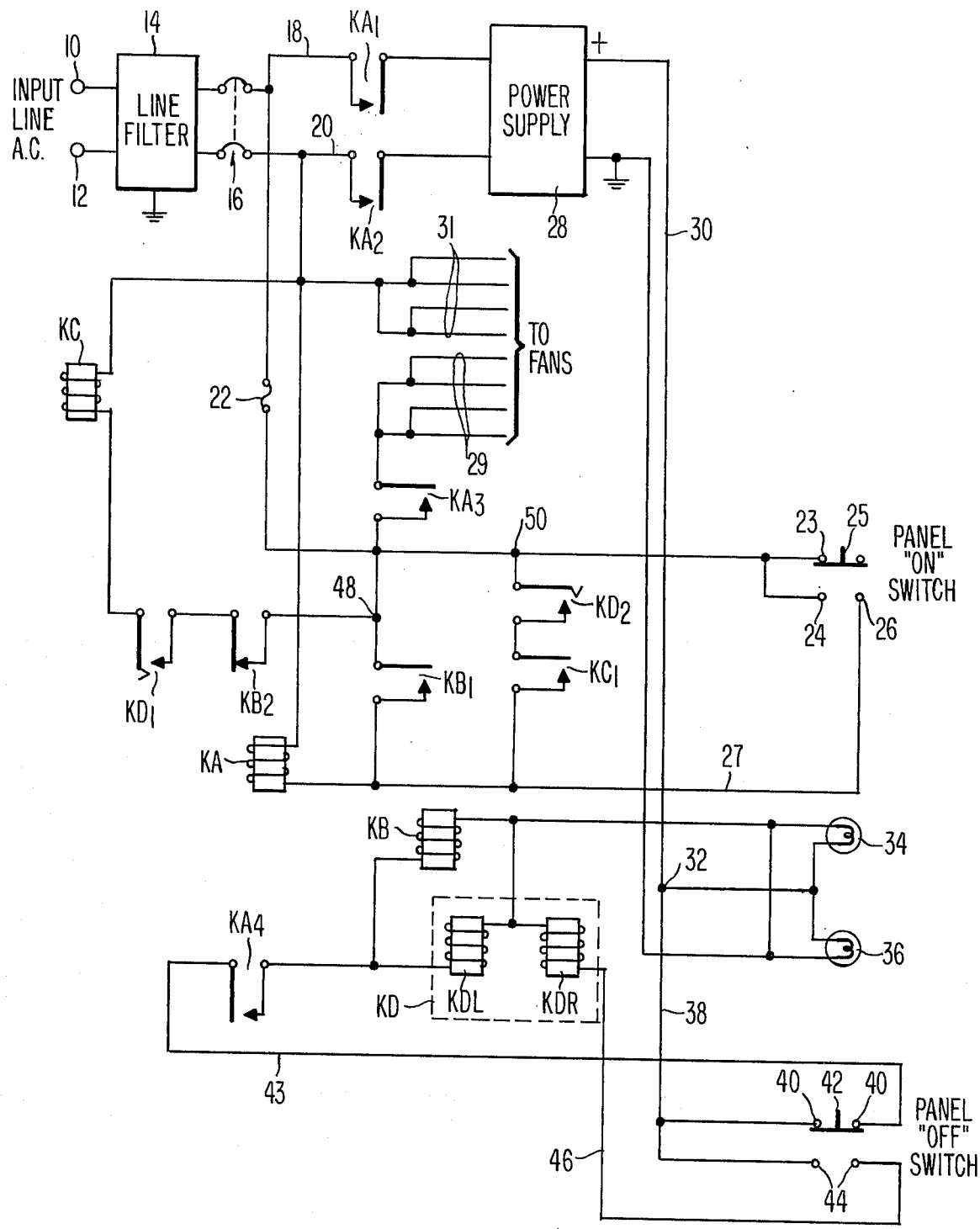

3,962,611

AUTOMATIC POWER RESTART FOR UNATTENDED ELECTRICAL EQUIPMENT

BACKGROUND OF THE INVENTION

In electrical and electronic systems such as computers, it is sometimes necessary that the equipment cabinets be located in remote areas or be otherwise unattended by an operator. Once manually started by actuation of an "ON" control button, a subsequent loss of AC power, even when followed shortly by power restoration normally requires that an operator visit the cabinet site to reinitiate the power turn-on cycle.

The circuit of the present invention obviates the last mentioned difficulty by providing a means of automatic power restart.

SUMMARY OF THE INVENTION

In accordance with the present invention, an automatic restart circuit is provided which is capable of restoring power to unattended electrical equipment after a power failure and restoration of power. The circuit is adaptable to any existing system utilizing independent "ON" and "OFF" power control means, such as separate push buttons, as distinguished from a simple toggle switch.

A two-coil mechanically latching relay is incorporated into the power control circuit. This relay "remembers" which control pushbutton, "ON" or "OFF", was last depressed. If the "off" button was depressed last, no automatic restart action is taken. However, if the "ON" button was pushed last and if AC power is lost and restored, an automatic turn-on cycle is initiated. The automatic restart circuit configuration is such that the normal manual "OFF" function may be realized at any time, such as during attended operation of the equipment or for routine maintenance.

As an added feature, the circuit may incorporate a time delay relay, adapted to be energized after power is restored following a fault, and providing a short time delay before the remaining relays energized and power is restored to the equipment. This action, of course, tends to eliminate the undesired effects of temporary and transient AC power restorations frequently occuring after a power fault.

Other features and advantages of the present invention will become apparent in the detailed description appearing hereinafter.

BRIEF DESCRIPTION OF THE DRAWING

The drawing depicts in schematic form the automatic restart circuit of the present invention, as it is employed in an actual computer cabinet.

DESCRIPTION OF THE PREFERRED EMBODIMENT

The automatic restart circuit contemplated by the present invention is depicted in schematic form in the drawing. As such, it represents an actual operative embodiment of the invention applied to the power control system of an electronic computer.

With reference to the drawing there is shown a pair of input terminals 10 and 12 for receiving the AC line power. The latter is applied via line filter 14 to the main circuit breaker 16 of the cabinet supply. Four relays are depicted in the drawing. Three of the relays are shown schematically as having a single coil and these are designated respectively KA, KB and KC. The last relay KC is assumed to be of the time-delay variety. Another relay KD is of the latch-in type and includes two coils designated respectively KDL for the "latch" function coil and KDR for the "reset" function coil. When a given one of the coils is energized, the relay contacts are mechanically latched in a predetermined state and will remain so even if the energization is removed. On the other hand, energization of the other coil, causes the contacts to latch in the opposite state. The pairs of switch contacts associated with each of the relays carries the appropriate coil notation plus a subscript reference numeral. For example, relay KA has four sets of contacts namely, $KA_1$, $KA_2$, $KA_3$ and $KA_4$. The contacts are represented schematically as singlepole, single throw (spst) switches, and in accordance with how they are shown in the drawing, that is, either open or closed, it is to be assumed that this is the normal condition of the contacts associated with an unenergized relay coil. In the case of relay KD, the contacts are shown in a "reset" state, implying that the KD reset coil was last energized.

In normal operation, the "ON" power sequence is as follows. The AC power on terminals 10 and 12, is fed through the line filter 14 and appears on the closed contacts of circuit breaker 16. Line 18 is assumed to be "hot"; line 20, neutral. The potential on the former is applied via line fuse 22 in common to the panel "ON" switch contact points 23 and 24. When the "ON" button 25 is momentarily depressed to initiate the power-up cycle, contacts 24 and 26 are shorted together and power is fed to relay coil KA by line 27. Relay contacts $KA_1$, $KA_2$, $KA_3$ and $KA_4$ which are all normally open, close upon the energization of relay KA. Power is applied via contacts $KA_1$ and $KA_2$ to a DC power supply 28. The closing of contacts $KA_3$ causes power to be applied simultaneously via lines 29 to a set of cabinet cooling fans and returned to the AC neutral via lines 31. One of the DC voltages, for example, 12 volts, generated by supply 28 is applied via line 30 to the center connection 32 of a pair of lamps 34 and 36 in the control panel, turning them on. This DC voltage is also fed via line 38, through the normally closed contact points 40 and button 42 of the panel "OFF" switch, the closed contacts $KA_4$, to both relay coils KB and KDL by way of line 43. The energization of the KB relay coil, causes switch contacts $KB_1$ to close, thereby strapping the "ON" button and keeping the power on. The energization of relay KB also causes contacts $KB_2$ to open, and relay KC remains deenergized.

The manual "OFF" sequence, as might be used to remove power from the cabinet for routine maintenance, involves the following. The panel "OFF" button 42 is momentarily depressed shorting across contact points 44. The DC voltage in line 43 applied in common to relay coils KB and KDL is removed therefrom, and is applied instead to the reset coil KDR via line 46. The deenergization of relay KB results in the unstrapping of the "ON" button, since contacts $KB_1$ are now open. Since AC power is no longer applied to relay KA, all of the associated contacts $KA_1$, $KA_2$, $KA_3$ and $KA_4$ open, thereby removing power from the machine DC power supply. The machine will now remain off until the "ON" button is again depressed.

The "ON" and "OFF" sequences described hereinbefore are manually initiated. As will be apparent from the following description, after the initial manual "ON" sequence, the circuit will provide an automatic power restart without manual intervention, after a power fault condition and subsequent power restoration. At the same time, the automatic feature does not prevent the initiation of a manual "OFF" sequence, whenever the latter is necessary.

It may be assumed that power is being supplied to electrical equipment as a result of the manual "ON" sequence. Upon AC power failure on the input line, the power supply 28 output voltage on lines 30 and 43 drops, removing power from both the KB and KDL relay coils. The opening of the $KB_1$ contacts deenergizes relay KA and all of its associated contacts open. It is important to note that while power has been removed from the KDL coil, the associated switch contacts $KD_1$ and $KD_2$ remain mechanically latched in a closed circuit condition. Upon AC power restoration, power is applied to the KC relay coil as a result of the closed circuit path from circuit connection 48 through the normally closed switch contacts $KB_2$, and the mechanically latched $KD_1$ contacts. After a predetermined time delay, normally about 30 seconds, the KC relay coil causes switch contacts $KC_1$ to close. This establishes a circuit path from connection 50 through the mechanically latched $KD_2$ contacts and the now closed $KC_1$ contacts to relay KA. This condition duplicates the action of depressing the "ON" panel button in applying AC line energization to the KA relay. The remainder of the power fault automatic restart sequence is the same as that described previously in connection with the manual "ON" sequence, except for the following. When relay KB is again energized, the $KB_1$ contacts close to strap the "ON" button, and the $KB_2$ contacts open, removing the energization from the time delay relay KC. This action opens the parallel circuit path which includes the normally open $KC_1$ contacts.

In conclusion, the automatic restart circuit of the present invention offers a reliable, low cost means for eliminating the need for manual restart in equipment subject to AC power failure. It should be understood that changes and modifications of the circuit organizations presented herein, such as the choice of relay coil voltages, may be needed to suit particular requirements. Such modifications and changes are well within the skill of the circuit designer, and insofar as they are not departures from the true scope and spirit of the invention, are intended to be covered by the following claims.

What is claimed is:

1. An automatic power restart circuit for use in a system having independent "ON" and "OFF" control means and in which AC power is delivered on a pair of lines to a DC power supply having at least a pair of output terminals, comprising:
    a plurality of electrical relays each having at least a set of contacts associated therewith,
    a first subcircuit having three parallel branches connected between a pair of nodes, one of said branches including said "ON" control means, means coupling one of said pair of nodes to one of said AC lines, a first of said plurality of relays having its coil interposed between the other of said nodes and the other of said AC lines,
    a second subcircuit including said "OFF" control means connected in series with one of said power supply terminals, the disposition of said "OFF" control means providing selectively a pair of alternate circuit paths, a second of said relays being of the "latch-in" variety and having coil means for providing both latching and reset functions, a third relay having its coil connected in parallel with the latching coil means of said second relay and both being included in a first of said alternate circuit paths, the second of said circuit paths including the reset coil means of said second relay,
    a third subcircuit connected across said AC lines, a fourth of said relays having its coil included in said third subcircuit,
    said first relay having at least one set of normally open contacts interposed between said AC lines and said power supply and a second set of normally open contacts connected in series relationship with the parallel combination of said second relay latching coil means and said third relay coil in said second subcircuit,
    a second of said parallel branches in said first subcircuit including in series one set of contacts of said second relay, and the normally open contacts of said fourth relay, the third of said branches in said first subcircuit including a set of normally open contacts of said third relay,
    said third subcircuit further including in series with said fourth relay coil another set of contacts of said second relay and a second normally closed set of contacts of said third relay.

2. An automatic power restart circuit as defined in claim 1 further characterized in that said "ON" control means comprises first, second and third active contact points, said first and second points being connected in common to said one of said nodes and said third point being connected to the other of said nodes, the manual actuation of said "ON" control means closing the circuit between said third point and said first and second points, thereby causing AC line power to be applied to the coil of said first relay.

3. An automatic power restart circuit as defined in claim 2 further characterized in that said "OFF" control means comprises first and second pairs of contact points located respectively in said first and second circuit paths of said second subcircuit, the unactuated condition of said "OFF" control means resulting in the shorting together of said first pair of contact points and the closing of said first circuit path, said second pair of contact points and said second circuit path being open at this time, the manual actuation of said "OFF" control means opening said first circuit path, and shorting together said second pair of contact points to close said second circuit path.

4. An automatic power restart circuit as defined in claim 3 wherein said second relay coil means comprises a pair of coils, the sets of contacts associated with said second relay assuming predetermined respective states in response to the energization of a given one of said coils and remaining latched in said respective states upon termination of said energization, said sets of contacts being caused to assume opposite respective states in response to the energization of the other of said coils.

5. An automatic power restart circuit as defined in claim 4 further characterized in that both sets of second relay contacts situated respectively in said first and third subcircuits assume an open state in response to the energization of said second relay reset coil means occuring upon the actuation of said "OFF" control means, and a closed state in response to the energization of said second relay latching coil means occurring upon the actuation of said "ON" control means.

6. An automatic power restart circuit as defined in claim 5 wherein said fourth relay is of the time delay variety.

* * * * *